H. Lindsey,

Double-Acting Pump,

No 589, Reissued Aug 24, 1858

N. PETERS, PHOTO-LITHOGRAPHER, WASHINGTON, D. C.

UNITED STATES PATENT OFFICE.

HOSEA LINDSEY, OF ASHEVILLE, NORTH CAROLINA.

IMPROVEMENT IN PUMPS.

Specification forming part of Letters Patent No. 13,881, dated December 4, 1855; Reissue No. 589, dated August 24, 1858.

*To all whom it may concern:*

Be it known that I, HOSEA LINDSEY, of Asheville, in the county of Buncombe and State of North Carolina, have invented a new and Improved Submerged Pump; and I do hereby declare that the following is a full, clear, and exact description of the same, reference being had to the accompanying drawings, forming a part of this specification, in which—

Figure 1:
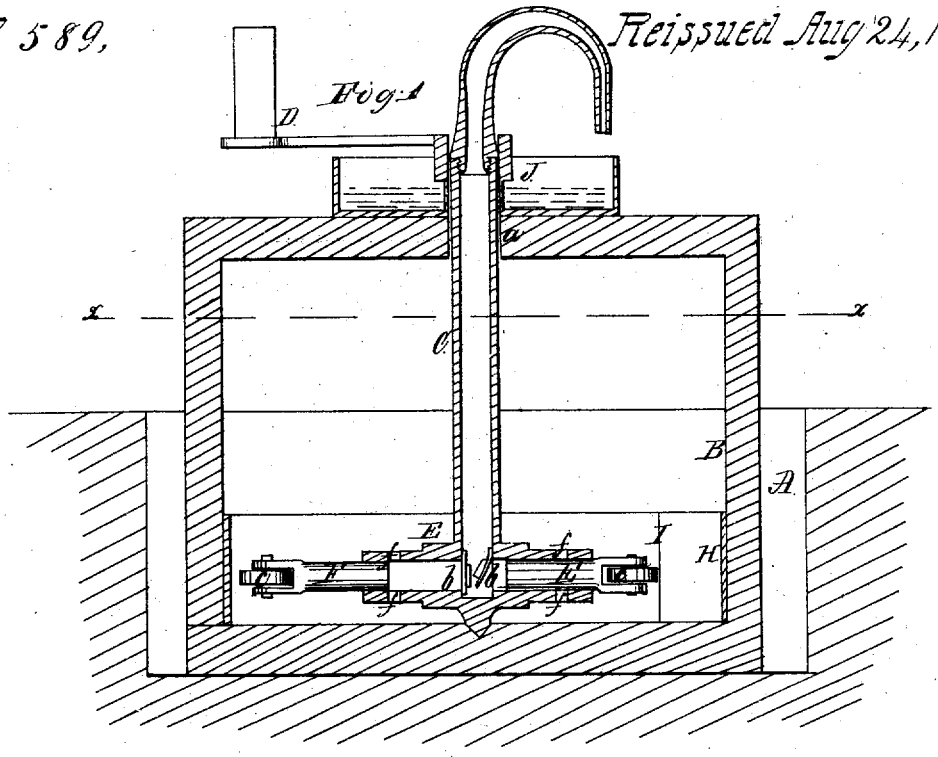
Figure 2:
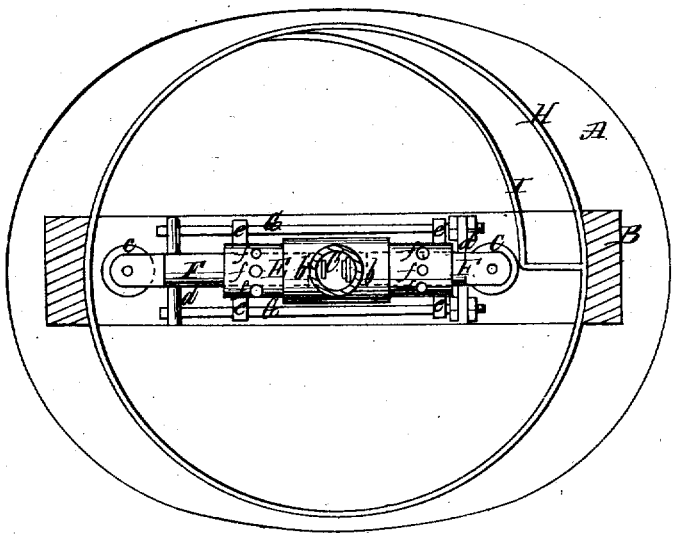

Figure 1 is a vertical section of my improvement, the plane of section being through the center. Fig. 2 is a horizontal section of the same, *x x*, Fig. 1, showing the plane of section.

Similar letters of reference in each of the several figures indicate corresponding parts.

The nature of my invention consists, first, in the combination and arrangement, in the manner specified, of the vertical central conducting-pipe, horizontal double-chambered or double-valved receiving and supplying cylinder, two alternately-reciprocating pistons, and piston connecting and guiding rods.

It also consists in effecting the reciprocation of the piston or pistons by means of a curved incline plane, arranged horizontally on the bottom of the well, thus reciprocating the piston or pistons, causing the water to flow into the cylinder and to be forced up the pipe into a receptacle at the top of the well.

To enable others skilled in the art to make and use my invention, I will proceed to describe its construction and operation.

A, Fig. 1, represents a well or reservoir containing water.

B is a suitable step or framing for supporting the working parts of the pump.

C represents a vertical pipe, the lower end of which rests in a step of the frame B. The upper end of the pipe C has a crank, D, attached to it, or gearing may be substituted for the crank when necessary. The upper part of the pipe C works in a proper bearing, *a*, at the top of the well.

E is a horizontal cylinder, which is attached to the lower end of the pipe C, the pipe communicating with the center of the cylinder E.

*b b* are valves of the cylinder. These valves divide the cylinder transversely into two chambers, and allow alternately a communication of the conducting-pipe with each of said chambers.

F F are pistons, which are fitted to each of the chambers of the cylinder E, said pistons fitting snugly the bore of the cylinder. The outer ends of the piston-rods have friction-rollers *c* attached to them, one to each, and a cross-bar, *d*, passes through the outer end of each piston-rod, the ends of said bars being connected by guide-rods G G, which work through eyes *e* attached to the sides of the cylinder E.

I is an eccentric segment or inclined plane, arranged horizontally on the bottom and against the circumference of the well, as shown clearly in Fig. 2.

J is a circular trough on the upper part of the box or framing B, the pipe C passing through the center of said box and having its end curved downward, as shown in Fig. 1.

The cylinder E is perforated with holes *f* near its outer ends, so that the water shall flow into its chambers at the proper time.

The operation of the pump when the horizontal incline plane is employed for moving the pistons is as follows: By turning the pipe C and cylinder E in any proper manner the rollers *c* will strike alternately against the incline plane I, and the pistons F F will be reciprocated, one moving inward and the other outward, and vice versa, and the water consequently will rush through the holes *f*, behind the pistons, as they are alternately forced outward, ready to be forced up the pipe C when the pistons are alternately forced inward. The valves *b* of course close as their respective pistons are forced outward and open as they are forced inward. The piston-rods being connected by the guide-rods G, one piston will be forced outward as the other is shoved inward, and the water will be forced out of the upper end of the pipe C in a continuous stream.

What I claim as my invention, and desire to secure by Letters Patent, is—

1. The combination and arrangement of the vertical central conducting-pipe, C, horizontal double-chambered or double-valved receiving and supplying cylinder E, two alternately-reciprocating pistons or plungers, F F, and piston connecting and guide rods G G, substantially as and for the purposes set forth.

2. Effecting the reciprocation of the piston or pistons F F by means of a curved incline plane, I, arranged horizontally on the bottom of the well, substantially as and for the purposes set forth.

The above specification of my improvement in pumps signed by me this 24th day of July, 1858.

H. LINDSEY.

Witnesses:

G. YORKE AT LEE,
D. W. FENWICK.